United States Patent
Yang

(10) Patent No.: US 7,863,765 B2
(45) Date of Patent: Jan. 4, 2011

(54) VERTICAL SHAFT TYPE WINDMILL WITH ARCUATE HOOK SHAPED VANE BLADES

(76) Inventor: Fu-Hung Yang, No. 149, Heping Rd., Pingjhen City, Taoyuan County (TW)

( * ) Notice: Subject to any disclaimer, the term of this patent is extended or adjusted under 35 U.S.C. 154(b) by 378 days.

(21) Appl. No.: 12/168,826

(22) Filed: Jul. 7, 2008

(65) Prior Publication Data

US 2010/0001525 A1    Jan. 7, 2010

(51) Int. Cl.
*F03D 9/02* (2006.01)
(52) U.S. Cl. .......................................... 290/44; 290/55
(58) Field of Classification Search .................. 290/55, 290/44; 416/124, 223 R
See application file for complete search history.

(56) References Cited

U.S. PATENT DOCUMENTS

| | | | | | |
|---|---|---|---|---|---|
| 4,031,405 | A | * | 6/1977 | Asperger | 290/55 |
| 4,447,738 | A | * | 5/1984 | Allison | 290/44 |
| 4,494,007 | A | * | 1/1985 | Gaston | 290/44 |
| 4,792,700 | A | * | 12/1988 | Ammons | 290/55 |
| 6,538,340 | B2 | * | 3/2003 | Elder | 290/55 |
| 7,400,057 | B2 | * | 7/2008 | Sureshan | 290/55 |
| 7,744,339 | B2 | * | 6/2010 | Flores Lumbreras | 415/4.2 |
| 2008/0298965 | A1 | * | 12/2008 | Keena | 416/41 |
| 2009/0146432 | A1 | * | 6/2009 | Ballena | 290/55 |

* cited by examiner

*Primary Examiner*—Michael C Zarroli
(74) *Attorney, Agent, or Firm*—Chun-Ming Shih

(57) ABSTRACT

A vertical shaft type windmill with arcuate hook shaped vane blade is composed of a tower, a rotary stand, a wind vane assembly, a generator and an electric controller. The present invention makes use of the wind power to drive the aforesaid structure to produce the mechanical power which being afterwards converted into the electrical power to supply various loads such as the domestic appliances, the public and roadway lighting. The structure is simply constructed, easy to fabricate and operate.

10 Claims, 11 Drawing Sheets

VERTICAL SHAFT TYPE WINDMILL WITH ARCUATE HOOK SHAPED VANE BLADES

BACKGROUND OF THE INVENTION

1. Field of the Invention

The present invention relates to vertical shaft type windmill with arcuate hook shaped vane blade, and in particular, to a highly efficient vertical shaft type windmill, which is equipped with uniquely, designed windmill vanes to effectively utilize natural wind power. The wind blows from all directions including the wind which instantaneously changes its direction, can be totally utilized.

2. Descriptions of the Related Art

Due to shortage of petroleum, the highly developed countries in the world, such as the U.S. and the west European countries have been eagerly seeking for other substitutable and environment conscious energy resources. Some of the new power generations have been in practice, of which are the wind power and the solar energy utilization.

The civilization of human being has rapidly progressed since the discovery of electricity, which greatly contributed to improving the living level of human being. As the living standards become higher, the demand for the electrical energy increases too. Now, the electricity is widely serving in many fields of application such as domestic, commercial, industrial, roadway lighting and public illumination, all of these consume a large amount of electrical energy. From switching on the lamps at night, opening the coolers or computers till any other electric appliances, a considerable amount of electrical energy is consumed together with paying an expensive electrical bill. On the other hand, such a social behavior causes a severe burdens to the power stations and brings about the problem of environmental contamination which results in green house effect, abnormal weather, holy infant phenomenon, and acid rainfall etc.

The steam power plant using petroleum as fuel, is the most popular technique nowadays. However, burning the petroleum produces a large amount of exhaust gas and heat which severely affects the living surroundings. Besides, petroleum has its limited sources from few countries of world only, and this precious natural resource might possibly wither away in the near future if the speed of consumption rate is maintained at the present rate.

Accordingly, seeking for new energy sources clean without contamination to replace with the petroleum is an important task. Selective ones among these are the wind power and the solar energy. The solar energy is the very source of all kinds of energy on earth with almost unlimited amount. It is regretful that owing to unmatured techniques, satisfactory utilization of the solar energy has to wait until the time comes when the efficiency thereof is improved to be applicable to countries with narrow territory or of less sunlight.

The wind power utilization, which has been prevailed in the European states historically for a long time, is one of the clean energy source on earth. In bye gone time the wind power was used for power source of grain milling or water pumping in the whole European areas. This matured traditional technique has a constant value though it can not completely replace the steam and hydraulic power at the present moment.

To fully make use of the wind power generation, a well constructed windmill is necessary. However, the effectiveness of the existing wind power generation technique with vertical shaft machine is still poor with considerable large loss, but it is of definite merit for its simple structure workable on a high truss stably with good balance and less noise. The reason why it is not very welcome at present lies in that it is structurally impossible to the problem of making use of the wind power coming from all direction since the wind power gained by the wind vane in the direction of the wind blow. As it has the advantage of a large starting torque, the vertical shaft windmill is better applicable to, for example, the bowl type wind gage, but it is disadvantageous for having a large resistance to the head wind. Thus its overall operational efficiency is poor. The blade type (Darius type) vertical shaft windmill needs a high starting wind speed for its slender blade shape and small blade inclined angle to the wind direction resulting in unable to start with a gentle wind, and the utilization factor of the wind power is low. The combination of the above two types of windmill failed to overcome the inherent disadvantages thereof completely, but only improved characteristic of starting with gentle wind, it is no contribution to the overall effectiveness.

In view of the foregoing situation, the inventor of the present invention herein goes to great lengths of intensive research and simulation based on many years of experience gained through professional engagement in this technical field, with continuous experimentation and improvement culminating in the development of the vertical shaft type windmill with arcuate hook shaped vane blade of the present invention not only applicable to the bulk wind power generating plant, but also widely able to supply power for small electrical consumer including the independent roadway lighting and public illumination, water pumping and pneumatic machinery.

SUMMARY OF THE INVENTION

It is the main object of the present invention to provide a vertical shaft type windmill with arcuate hook shaped wind vane blades in which vane blade formed into narrow angle arcuate shape to operate in the head wind direction area. More than ten sets of arcuate hook shaped vane blade assembly are used with their outer edges overlapped one another like fish scales so as to avoid intrusion of the head wind into the wind vane wheel such that most portion of the wind resistance can be eliminated. At the near zero degree head wind zone wind may refract to reach the adjacent arcuate hook shaped vane blade to generate rotational torque, while more than two vane blades can generate strong rotational torque with their hook shaped vane surface in the tail wind zone. By so, such a windmill is able to accept wind power coming from all directions without using the rudder or tail surface so as to widen the tail wind area thereby operable with low resistance and high efficiency for wind power generation.

Another object of the present invention is to provide a vertical shaft type windmill with arcuate hook shaped vane blades which can be easily fabricated with a low cost and operable stably at high elevation. The outer looking thereof should be easy on eye to match the aim of beautification of the local surroundings and suitable for supplying electricity to the domestic appliances, roadway lighting, agricultural and fishing use.

To achieve the aforesaid objects, the vertical shaft type windmill of the present invention comprises a tower, for supporting the installation of the present invention. In the middle of the tower there is provided with an annular track for a rotary stand to roll along, a generator chamber is formed under the tower to install a generator and an electric controller. The rotary stand is constructed of a truss to entrain wind vane assembly. The rotary stand is provided with wheels underneath to roll along the annular track. As soon as the wind vane assembly receives the wind force, the rotary stand rotates around the annular track. On the rotary stand there are wind vane braces to fasten the wind vanes with screws. A large speed increaser is conjoined to the lowermost outer edge of the rotary stand. A wind vane assembly includes several wind vane wheels stacked on top of one another and one wind vane wheel is composed of several arcuate hook type vane blade assemblies interposed between an upper and a lower vane blade template, one layer of wind vane wheel is composed of more than ten sets of arcuate hook type vane blades. The larger the outer diameter, the more the blades are contained. The vane blades should be combined together tightly in order to attain a high efficiency. The wind vane wheels are disposed uniformly with equal angle distance on the rotary stand so as to balance the weight thereby rotating the wind vane wheels stably. Easy vane blade is designed to accept two kinds of wind force to minimize wind resistance. The outer layer blade surface inclines about 20° with respect to the outer edge of the wind vane wheel so as to effectively eliminate head wind resistance and obtain a best rotating effect without using any damper. In 340-0-45° tail wind zone, the wind blows along outer edge of the vane surface, and the exerted wind force is refracted into the adjacent hook type vane blade zone to rotate the wind vane assemblies. In 46~100° tail wind zone, the vane blades accept a vertical wind force with the highest efficiency. With this scheme, about 66% of total wind vane area is available to receive the wind force to generate a rotating torque able to start operation with gentle wind efficiently. The wind vane assembly faces to the head wind force at wind direction between 270~359° zone, but the rotation can be maintained only if the resistance can be lowered. Accordingly, when the arcuate blade surfaces makes an angle of 37 with the wind direction in the present invention, the longer the blade, the smaller the above angle will be. The vane surface is an arc surface and makes an angle about 20° with the outer edge of the wind vane wheel. Moreover, the outer edge of the vane blades are stacked on top of one another like fish scales so as to avoid intrusion of head wind into the interior of the wind vane wheel. By so, when the wind blows along narrow arcuate vane blade surface, it is refracted outwards so as to almost completely eliminate the head wind resistance and keeps rotation of the windmill. In the arcuate type zone, the wind direction will be turned from the head wind zone to the tail wind zone so as to produce an effective rotational torque. Two adjacent arcuate hook type vane blades at the hook typed zone need to retain proper clearance for wind to blow through so as to enhance the rotation of the windmill and the generator. In case three layers of the wind vane assembly are composed, by varying its diameter and size of the wind vane assembly, a variety of combination and different construction can be made. The generator installed in a generator chamber under the tower is conjoined with a small speed increaser so as to transmit the mechanical power produced by rotation of the rotary stand to a large speed increaser installed beneath. The larger speed increaser will drive the small one to rotate the generator. An electric controller provided in the generator chamber is to control and output the electrical power generated by the generator securely.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
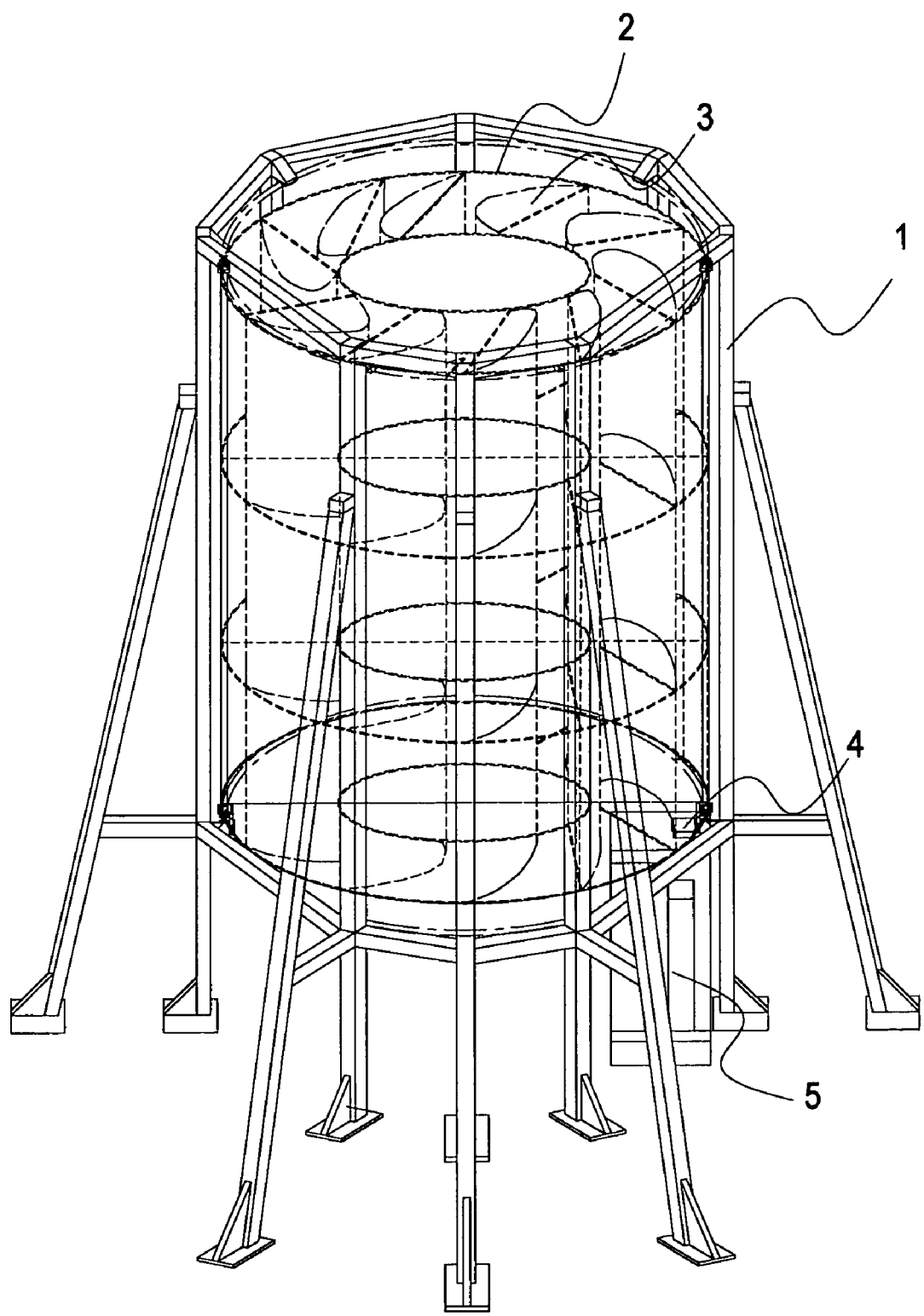
FIG. 1 is a thee dimensional view denoting the position of detailed parts according to the present invention.

Referring to all attached drawings from FIG. 1 through FIG. 11, the present invention provides a vertical shaft type windmill with arcuate hook shaped vane blades capable of utilizing wind flowing from all direction to drive a generator for generating electrical power. The windmill essentially comprises a tower 1, a rotary stand 2, a wind vane assembly 3, a generator 4 and an electric controller 5. The tower 1 is composed of several post pairs 13. One post pair 13 contains two posts and the post pairs 13 are disposed annularly to form a circular loop. A cross beam 14 is transversely interposed between the adjacent post pairs 13. The tower 1 is responsible for supporting the weight of the whole structure and installations. An annular track 11 is conjoined to the foot of the tower 1 with screws so as to support the rotary stand 2 and the wind vane assembly 3. The tower 1 accommodates a generator chamber 12 to house the generator 4 and the electric controller 5 in it. A large speed increaser 23 is screw combined to the foot of the rotary stand 2 and further couples with a small speed increaser 24 thereby the generator 4 is driven to generate electric power. The speed amplifier may be a gear set, chain with sprocket or the like. The wind vane assembly, which being installed in the rotary stand 2, is composed of several wind vane wheel 31. In the present invention, three layered wind vane wheels 31 are used, and more than 10 sets of arcuate hook shaped vane blade assembly 32 are included. The three layered wind vane wheels 31a, 31b, 31c are installed in the rotary stand 2 (see FIG. 6).

Figure 2:
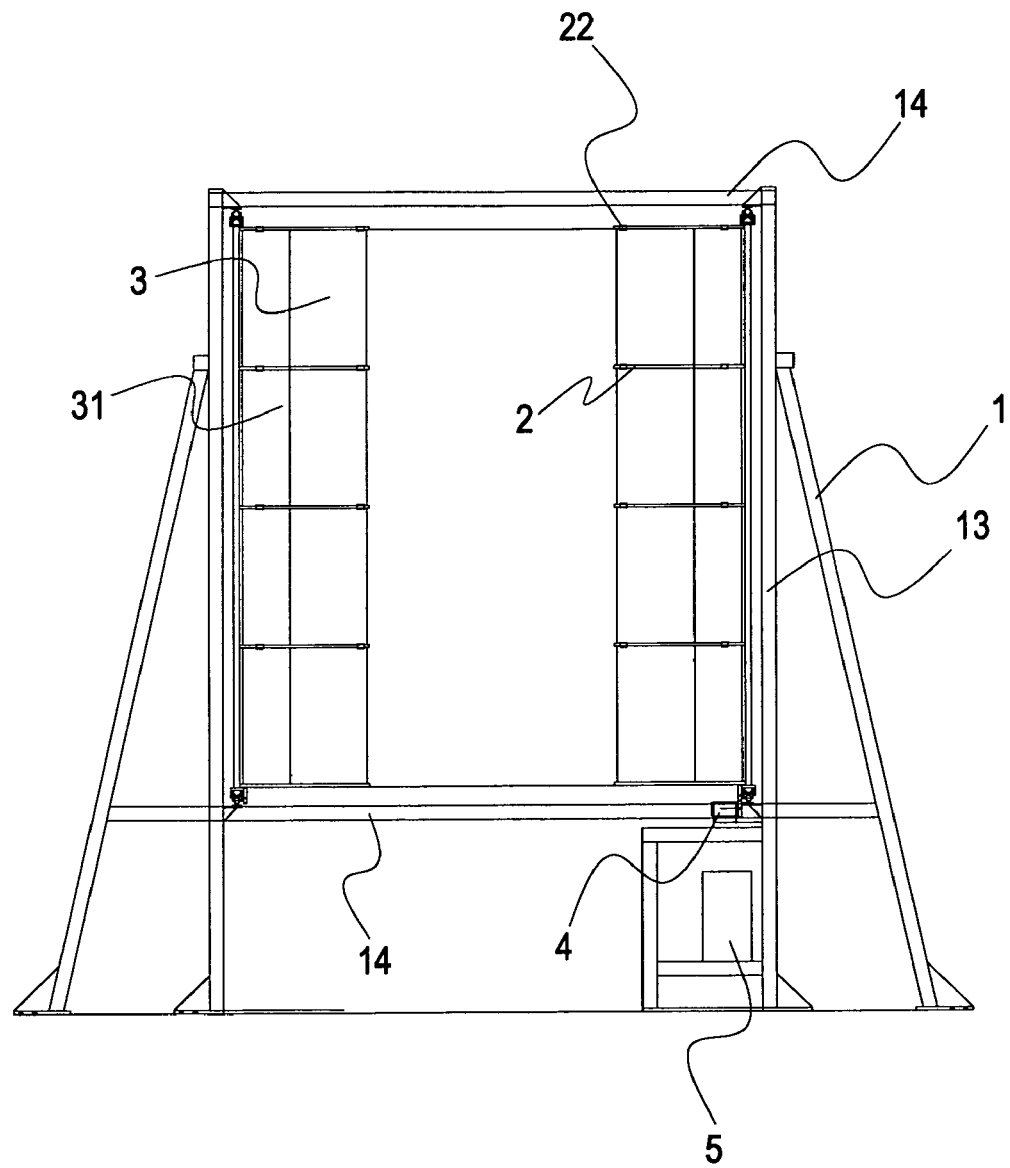
FIG. 2 is the front view of FIG. 1.
Figure 3:
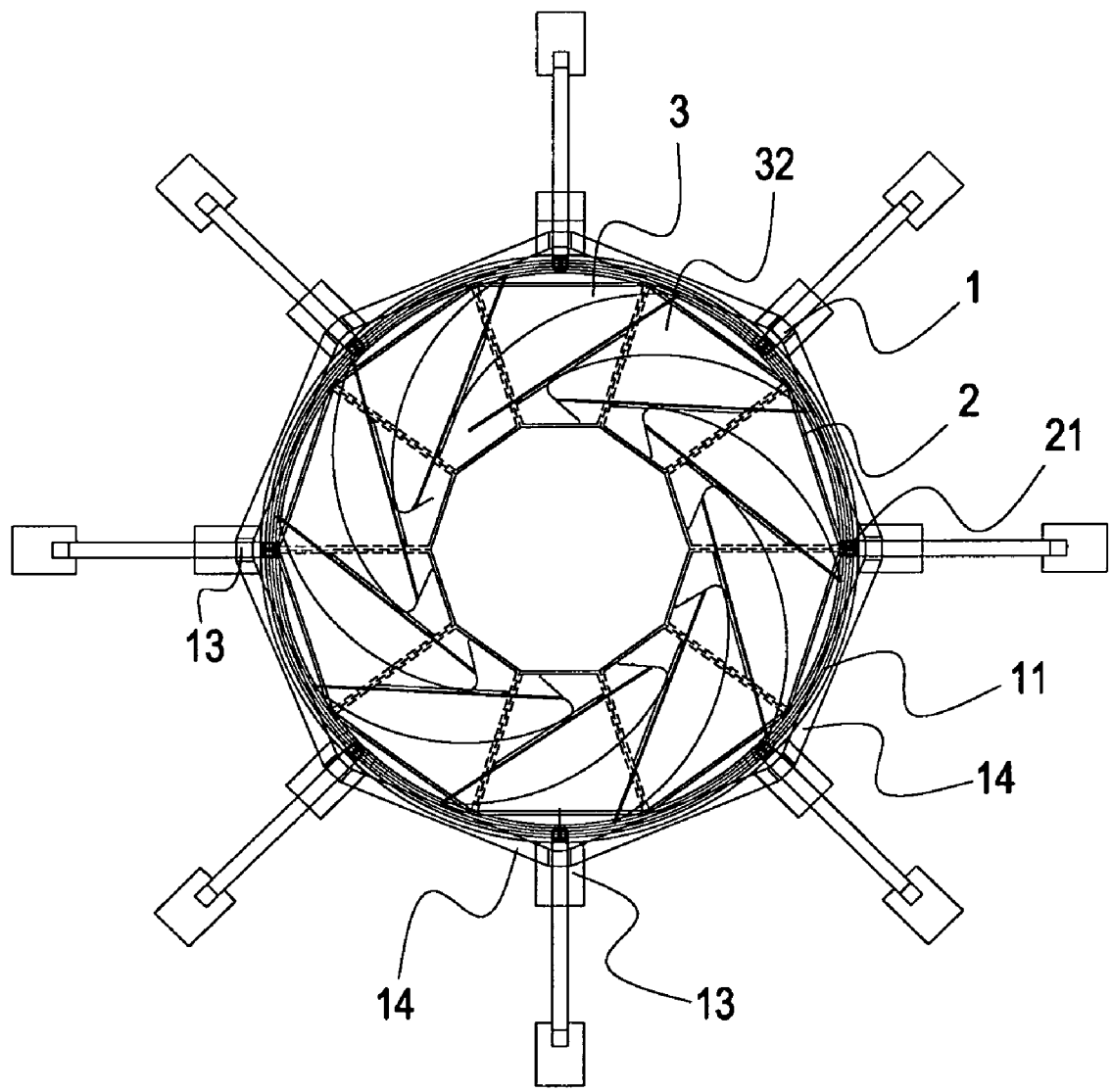
FIG. 3 is a top view of the present invention.
Figure 4:
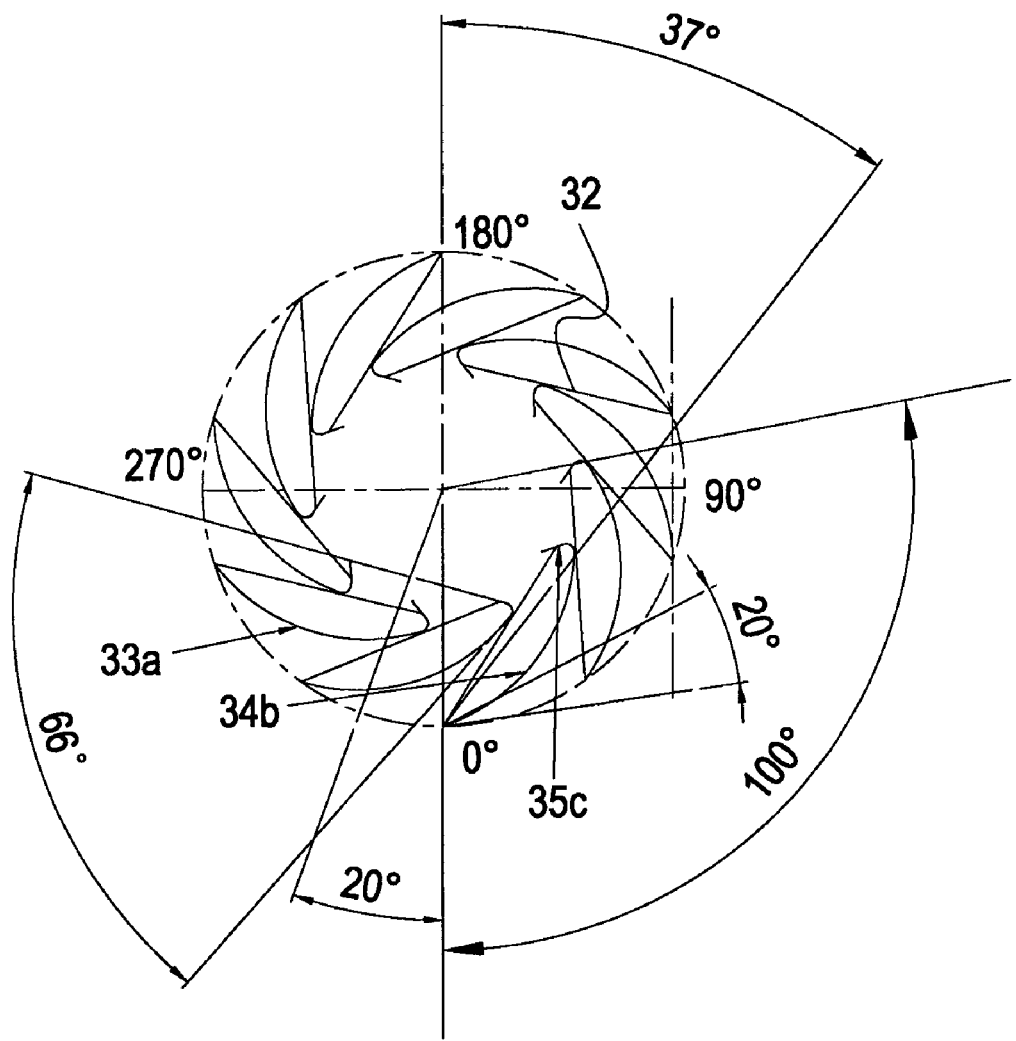
FIG. 4 is a top view of the wind vane wheel according to the present intention.
Figure 5B:
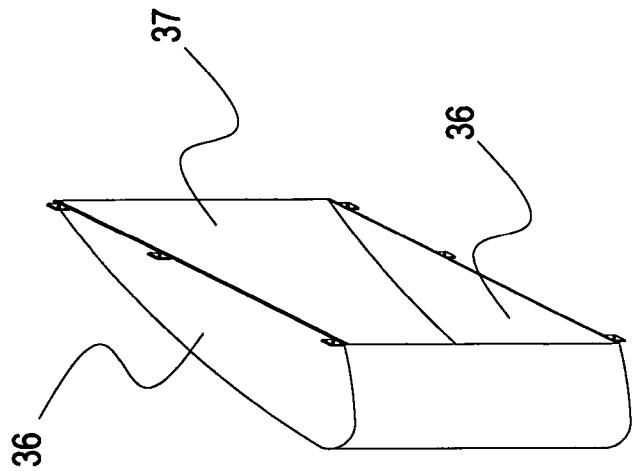
FIGS. 5A and 5B are perspective views showing the arcuate hook type vane blade according to the present invention.
Figure 5A:
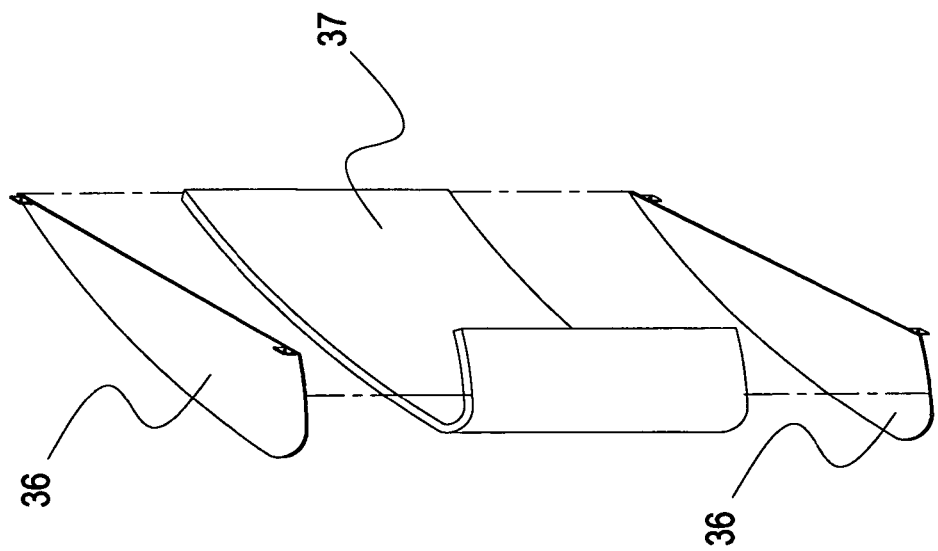

Referring to FIGS. 2, 3 and 4, when installing the arcuate hook shaped vane blade assembly 32, it is understood from the position of wind vane surfaces 33a, 34b, and 35c, the arcutate blade surface of the wind vane surface 34b makes an angle of about 37° with the direction of tail wind. The wind vane surfaces 34b and 35c make an angle about 66° between them to allow wind blows to a zone between 46° and 100° to exert a maximum wind force on the two vane surfaces 34b and 35c thereby driving the wind vane assembly 3 to rotate powerfully. In order to reduce the head wind resistance at the wind direction between 270°~339°, the wind vane surface 33a makes an angle 20° with the outer edge of wind vane wheel 31 to release most of the head wind resistance so that reduces the wind resistance as small as possible during operation. Each of the arcuate hook shaped vane blade assembly 32 in the wind vane wheel 31 is to rotate form 0°, 90°, 180°, 270° to 359° against the wind direction, the wind vane surfaces 34b, 35c inside the blade assembly 32 against the wind direction are configured in the hook shape making an angle of 66° with each other (designated by the present invention), then the wind blow in the 340°-0°-100° zone against the wind direction is able to produce rotational torque for the wind vane assembly 3. As soon as the vane blade assembly 32 rotates to the 270°~330° zone against the wind direction, the wind vane surface 33a makes an inclined angle about 20 with the edge of the wind vane wheel 31 to allow the head wind to side pass. Moreover, above 10 sets of the adjacent acuate hook shaped vane blade assembly are stacked on top of one another to prevent intrusion of head wind into the wind vane wheel thereby offsets most of the rotational resistance. The polished material used on the contact surface of the vane blade assembly 32 with the wind contributes to refracting the wind into the wind vane wheel 31 in the 340°~45° zone where the wind blows to the wind vane surface 34a. The refracted wind turns to pass through the wind vane surfaces 34b, 35c located at the hook shaped zone adjacent to the tail wind zone along the center of axis. The wind force is accepted here and turned transversely to drive the wind vane assembly 3. In the 46°~100° zone where wind is able to blow on the vane surfaces 34b, 35c, it is squeezed into the wind vane wheel 31 to produce maximum rotational torque for the wind vane assembly 3. In the hook shaped zone, a proper clearance between the adjacent two vane blade assemblies 32 must be left for the wind to pass through. Due to above 10 sets of the arcuate hook shaped vane blade assembly 32 are used, there will be at least two or more which straightly facing to the wind to accept the wind power for working. In the case there is a turmoil caused by a whiff of irregular side or back wind, it is turned into a uni-directional wind acceptable by the vane surfaces 34b and 35c as an effective wind power to drive the wind vane assembly 3. The arcuate hook shaped vane blade assembly 32 is able to make use of the wind power from all direction in the 120° large area of wind blow. According to the present invention, it is able not only to utilize the wind force coming from any direction in a large area, but also more effective if the area of arcuate shaped vane blade is widened so as to efficiently drive the generator 4.

Referring again to FIGS. 3,6,9 and 11, when the wind vane assembly 3 is driven to rotate by wind from all directions, the track wheels 21 on the rotary stand 2 on which the wind vane assembly 3 is bolted to, can roll around on the annular track 11 installed on the tower 1 so that the rotary 2 also rotates around the annular track 11 restlessly as long as the wind blows. The large speed increaser 23, which being screwed onto the lower edge of the rotary stand 2, is a transmission means made of a gear set, or chain and sprocket couple or the like. For example, it the large speed increaser 23 is replaced with a chain, while the small speed increaser 24 coupled to the shaft of the generator 4 is replaced with a sprocket of the diameter 0.3 m, the diameter of the rotary stand 2 is 15 m, the speed will be increased 50 times (15/0.3=50). That means, if the rotary stand 2 rotates at 20 rpm, the generator 4 will rotate at 1000 rpm to convert the mechanical power into the electrical power via electric controller 6 and then outputted to the user's load such as water pumping for use on agriculture, fishing and pasturage, or pneumatic machine used to produce compressed air for various kinds of industrious and fishing application.

Referring to FIG. 2, in the present invention, the diameter of the wind vane assembly 3 and the wind vane wheel 31 may vary according to the different needs, or a plurality of the wind vane wheels 31 are connected in cascade into a bulk wind vane assembly 3 with a several times of height of single one so as to enlarge the area of the wind vane assembly 3 to accept the wind force thereby suitably applicable to a load of high density demand in a narrow area. Bulk wind vane assembly 3 is suitable for running in the wind power station above 10 kw to 10,000 kw. The power station using medium size wind vane assembly 3 is suitable for power supply to domestic, district agriculture, pasturage, or fishing load, and the small one can be used to supply power for 0.3 kw~1 kw roadway lighting.

Figure 9:
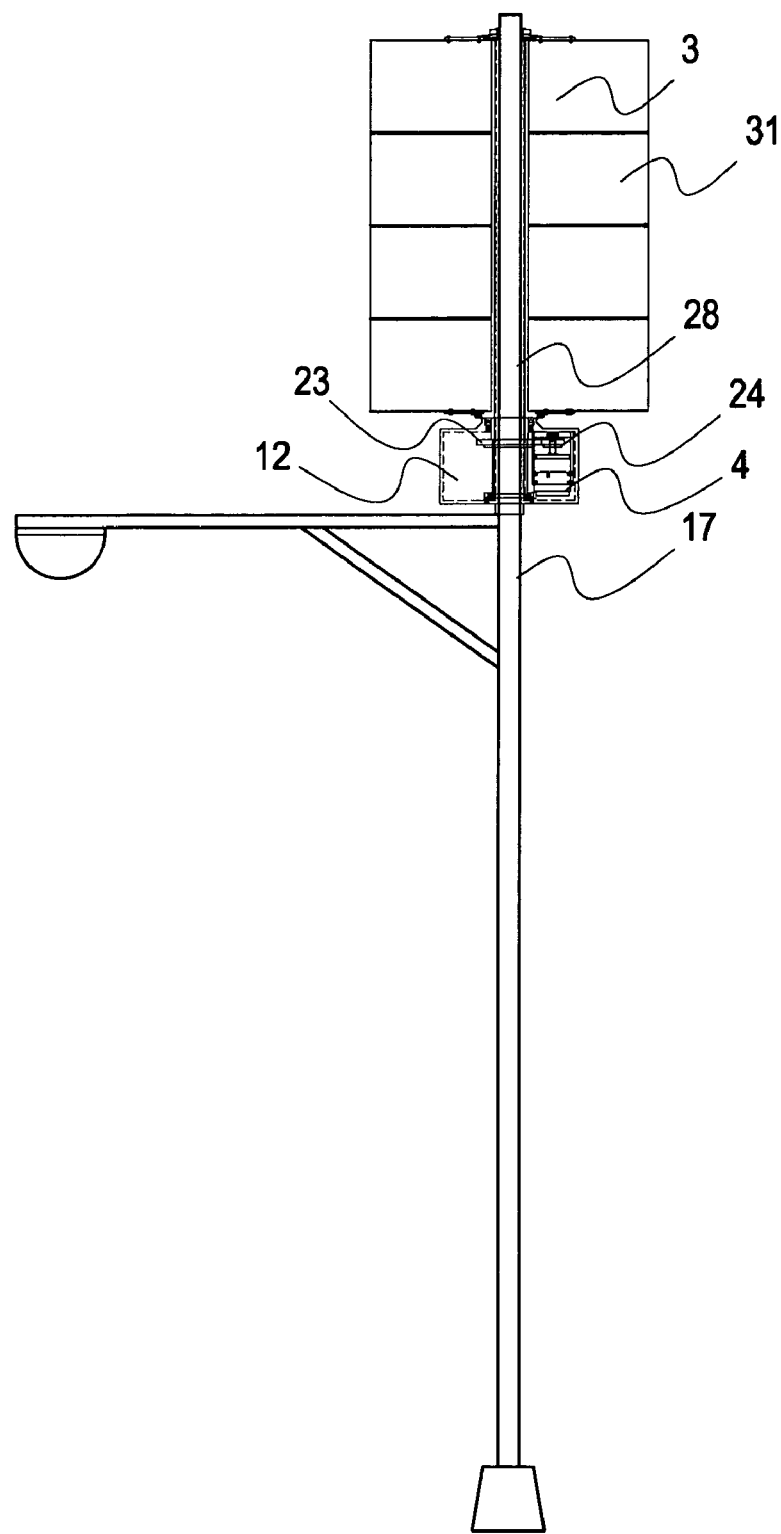
FIG. 9 is a schematic front view of the wind power generator for roadway lighting according to the present invention.
Figure 10:
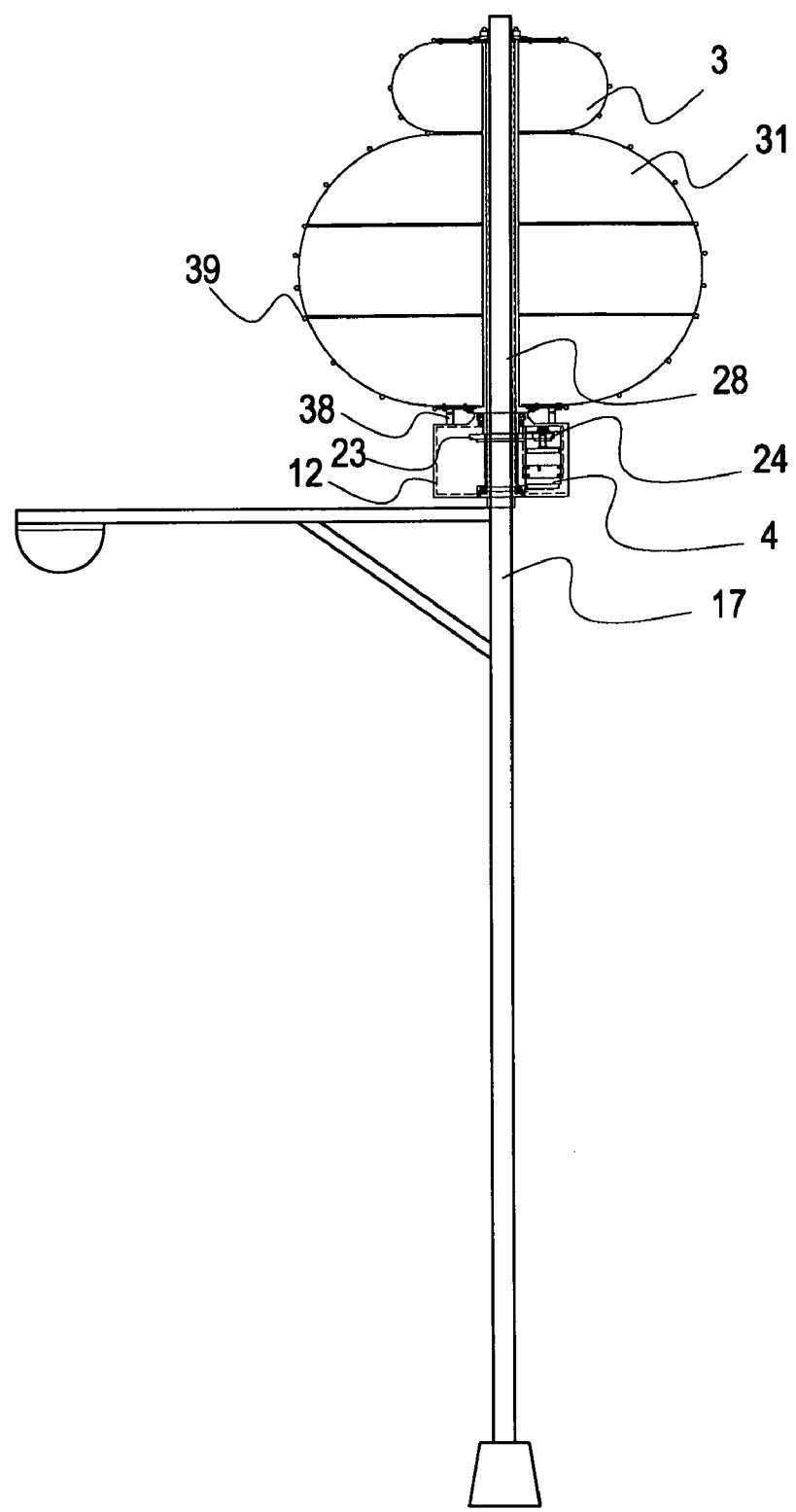
FIG. 10 is a schematic view of the wind power generator for roadway lighting equipped with a wind vane wheel of different diameter and colored LED lamps according to the present invention.
Figure 11:
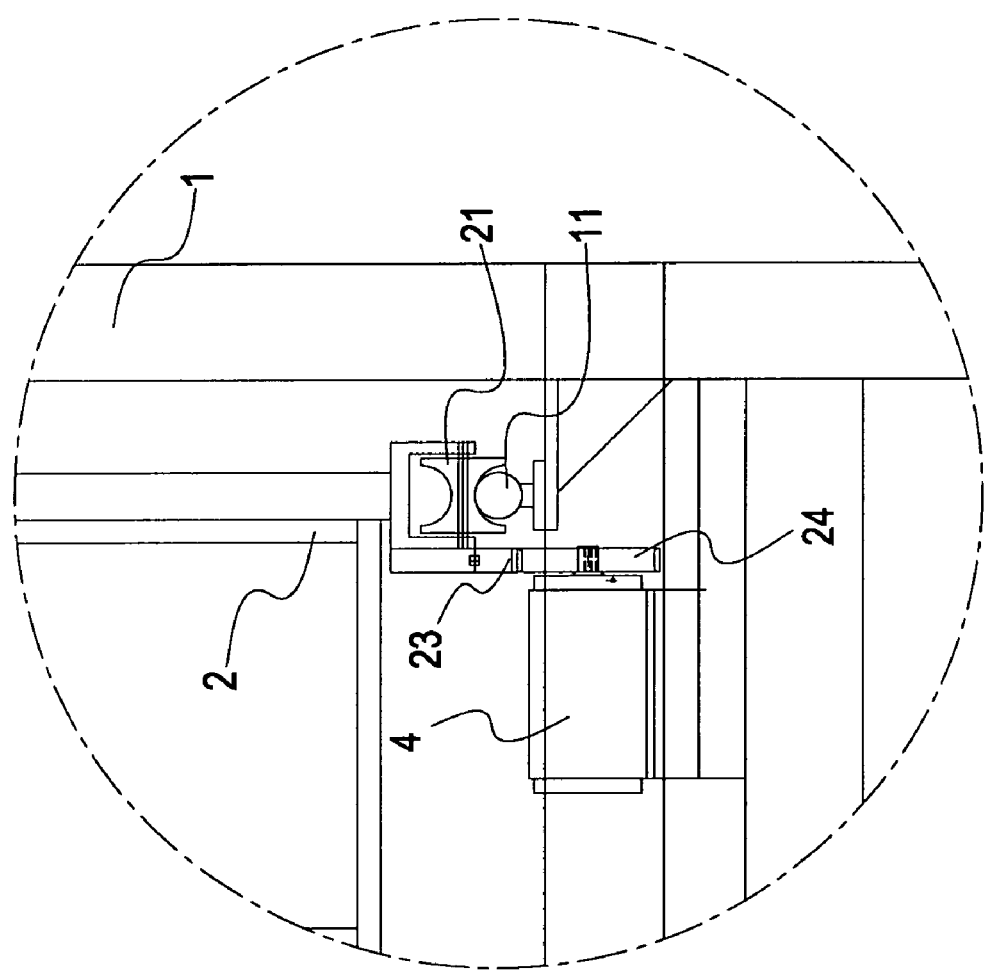
FIG. 11 is a schematic view of the track wheel according to the present invention.

Referring to FIGS. 3, 4 and 9, the tower 1 is a truss structure constructed of several post pairs 13, and two posts are contained in one post pair 13. The post pairs 13, which being disposed in an annular shape, can have a desired diameter by adjusting the number of post pairs 13. A cross beam 14 is laid transversely between two adjacent post pairs 13. The adjustment for the diameter of the windmill can be easily attained by varying the diameter of the annular track 11 and the number of large speed increaser, and then varying the size of the rotary stand 2. In case it is necessary to widen the area in wind direction, the rotary stand 2 should be higher, and the number of arcuate hook shaped vane blade assembly 32 should be more. For example, increasing two layers of the wind vane wheel 3, or making the tower 1 higher to expand the capacity can be easily achieved.

Figure 6:
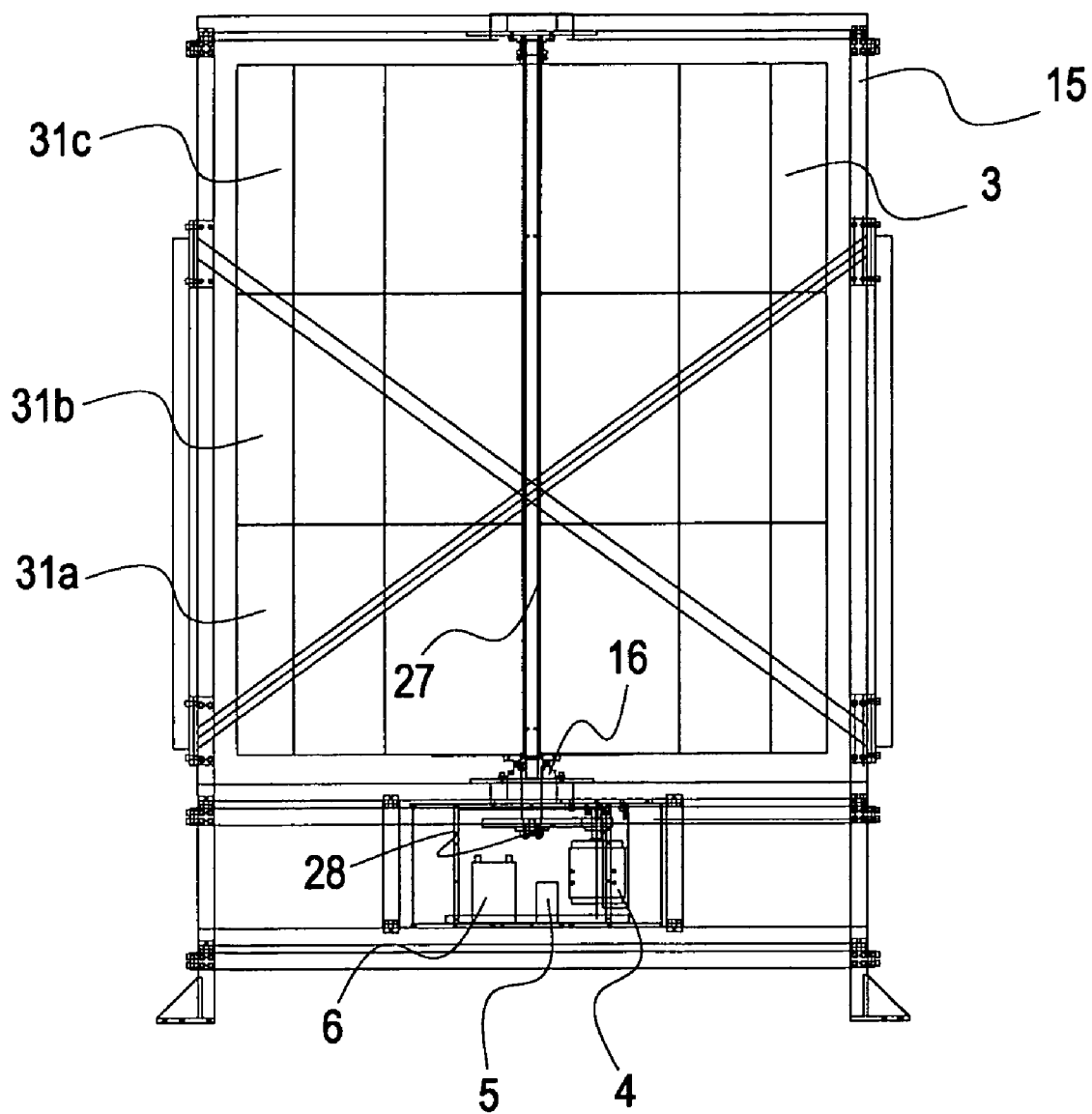
FIG. 6 is a front view showing the small size wind power generator according to the present invention.
Figure 7:
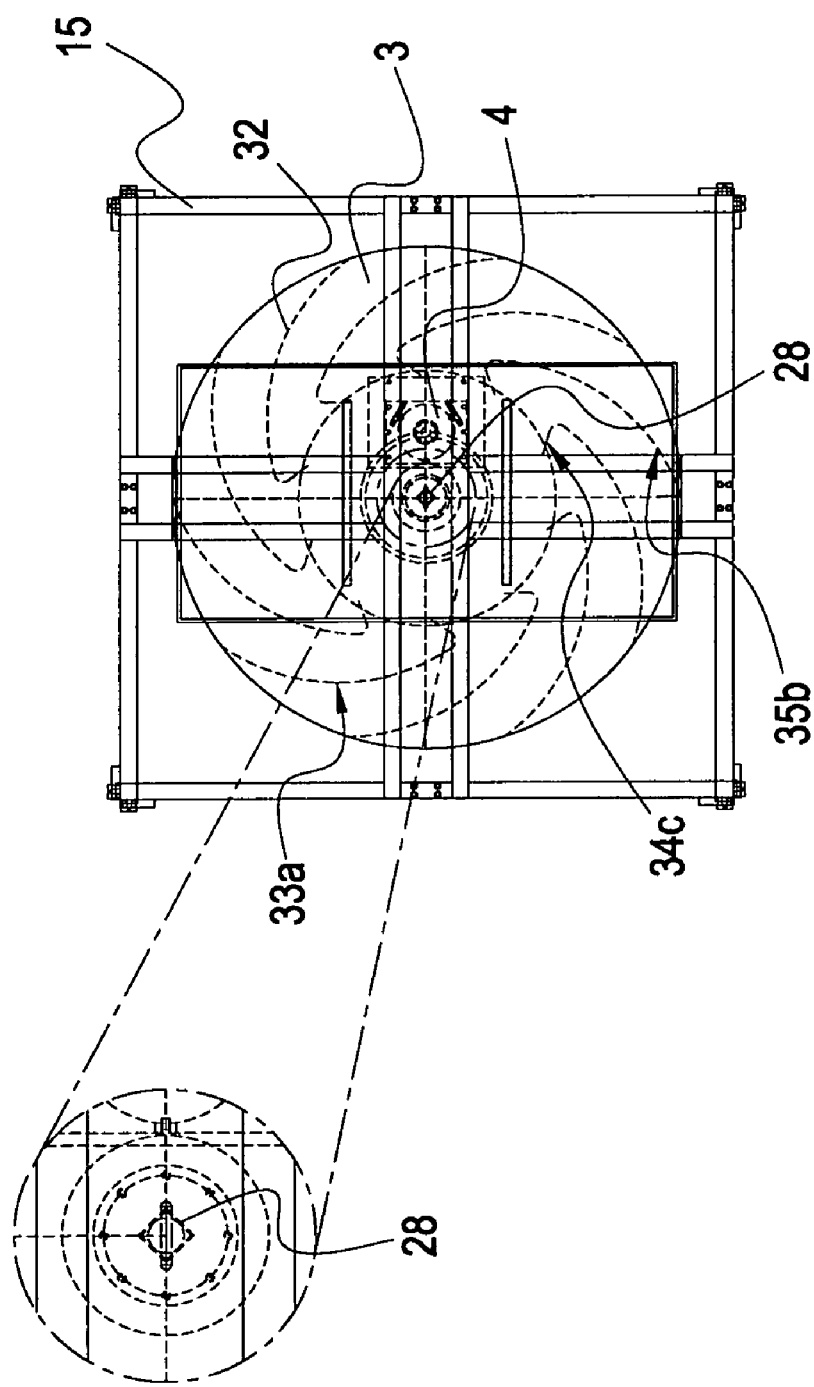
FIG. 7 is a top view showing the small size wind power generator according to the present invention.
Figure 8:
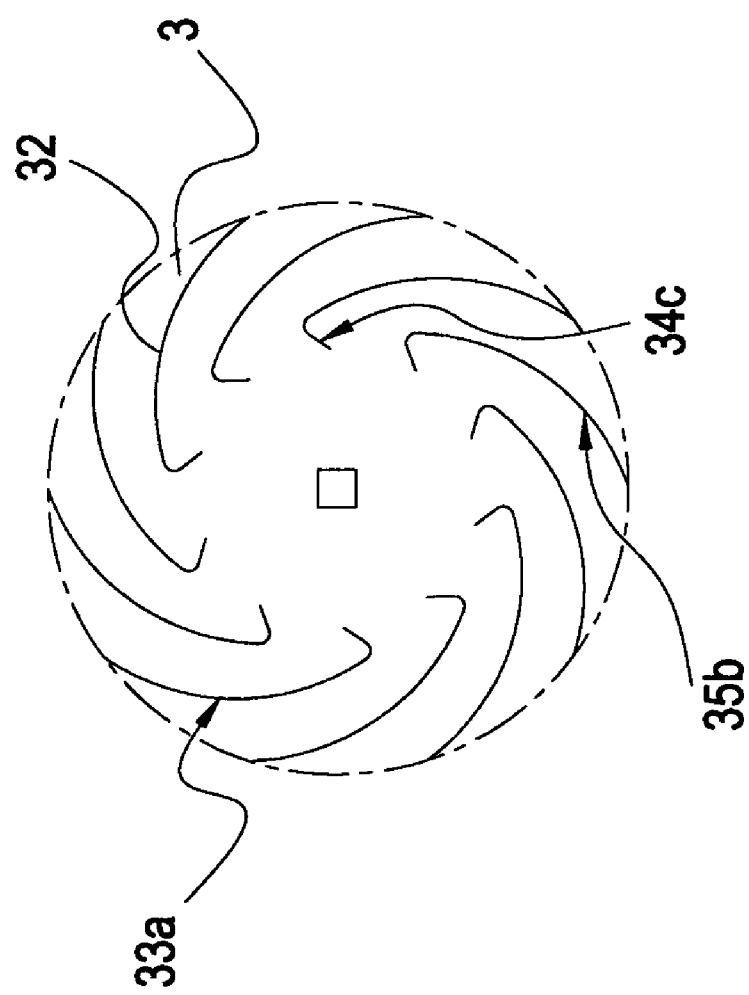
FIG. 8 is a top view showing the wind vane wheel of the small size wind power generator of the present invention.

Referring to FIGS. 6 and 7, the structure of the present invention is applicable to small installation below 10 kw. Remaining the structure of vane blade assembly 32 unchanged, only using a small tower 15 of reduced size, and using a square rotating shaft 27 to connect the wind vane assemblies in cascade on a rotary base 16, and changing the coupling ratio of the transmission means to drive the generator 4, storing the electricity in a storage battery 6 and controlling the output with the controller 5, a small size vertical shaft wind power plant is thus carried out. The small tower can be constructed of individual pipe material using simple implement tools in DIY manner, and the wind vane wheel 3 can also be assembled in DIY manner. The generated electrical power is supplied for agriculture, fishing and pasturage use.

Referring to FIGS. 6, 7, 9 and 10, the power generated by the windmill generator of the present invention can also be supplied to roadway lighting of capacity below 1 kw, with the arcuate hook shaped vane blade assembly 32 keeping its structure same as above, only changing the structure of the small tower 15 into one in which a steel pipe frame 17 pierces through a hollow rotating shaft 28 so as to sustain the windmill machine at 6~10 m height to work by the wind power and store the electrical energy in the storage battery 6 and then controls the output with the controller 5 to illuminate the public roadway light at night. By changing the diameter of the wind vane wheel 31, or attaching a miniature power supplier 38 under the wind vane wheel 31, and equipping colored LED lamps around the rim of the wind vane assembly 3 for beautification of the night scene. This contrivance can also supply power to the water heater or various domestic appliances.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A vertical shaft type windmill with arcuate hook shaped vane blades, comprising:

a tower having an annular track and a generator chamber respectively provided on the upper and lower parts thereof, a generator and a electric controller being housed in said generator chamber, and a rotary stand with wheels being mounted on said annular track, wherein said tower is used to entrain the whole structural load and conjoin all structural parts;

a rotary stand constructed of round type frames with several track wheels annularly disposed beneath to roll around said annular track under said tower; wherein said rotary stand is divided into several steps, each step has more than 10 sets of arcuate hook shaped vane blade assembly bolted one another, and a large speed increaser is screw combined to the foot thereof, said rotary stand accepts the wind force to drive a wind vane assembly so as to transmit the mechanical power produced by rotation of said rotary stand to said large speed increaser underneath;

a wind vane assembly composed of several wind vane wheel stacked on top of one another and mounted on said rotary stand, said wind vane wheel being composed of more than 10 sets of said arcuate hook shaped vane blade assemblies, and each said blade assembly having 2 wind vane surfaces making a hook angle about 66° with each other to accept the wind power to rotate; wherein the edge of said wind vane surface is configured into an arcuate surface to make an angle of about 20 with the edge of said wind vane wheel so as to eliminate most of the head wind resistance, several wind vane blades are stacked on top of one another to prevent intrusion of the head wind into said wind vane wheel thereby allowing said wind vane wheel to rotate under minimized head wind resistance;

a generator accommodated in said generator chamber built under said tower, wherein said generator shaft is coupled with a small speed increaser so as to transmit the mechanical power produced by the rotation of said rotary stand to said large speed increaser beneath and drive said small speed increaser and further drive said generator to generate the electrical power; and an electric controller accommodated in said generator chamber to integrally control the electrical power generated by said generator.

2. The vertical shaft type windmill of claim 1, wherein said arcuate hook shaped wind vane surface is configured in arc surface and makes an inclined angle of about 20° with the rim of said wind vane wheel, when said wind vane rotates to a position making an angle in the range of 340°-0°-45° to the wind direction, the wind is refracted in the adjacent hook shape vane blade surface and pushes said wind vane wheel to rotate, wherein the contact surface of said hook shaped vane blade surface is made of polished material to reduce the wind resistance.

3. The vertical shaft type windmill of claim 1, wherein said arcuate hook shaped vane blade assembly has two vane surface crossing with each other to configurate in hook space so as to accept the tail wind power and refract the incident wind to rotate, and further turn the head wind into the tail wind thereby producing an effective wind power to drive said wind vane wheel, said adjacent two arcuate hook shaped vane blades retain an appropriate clearance there between to let through the wind.

4. The vertical shaft type windmill of claim 1, wherein said arcuate hook shaped vane blade assembly is composed of an upper and a lower templates and said arcuate hook shaped vane blades are disposed in the manner that above ten sets of vane blade assembly each of them is bolted to interior of said rotary stand with an equal angle separation on a vane blade mounting base.

5. The vertical shaft type windmill of claim 1, wherein said wind vane assembly is formed of more than one layer of said wind van wheels stacked on said rotary stand such that it is able to expand installation by increasing the layers of said wind vane wheel.

6. The vertical shaft type windmill of claim 1, wherein said rotary stand is provided with more than 4 track wheels annularly disposed with an equal angle separation around the bottom rim thereof to allow said track wheels rolling along said annular track of said tower, said track wheels entrain the total weight of said rotary stand and said wind vane wheels, it is allowed to install like track wheels on the upper part of said rotary stand to enhance stability of said rotary stand and prevent said rotary stand from becoming ramshackle due to strong wind.

7. The vertical shaft type windmill of claim 1, wherein said large speed increaser utilizes the outer diameter of said rotary stand as a major gear to drive a small follower gear coupled to said generator so as to achieve high multiplication of rotating speed, the larger the rotary stand, the higher the speed increases, the above spur gear system can be replace by a bevel gear driving a looped chain and sprocket unit.

8. The vertical shaft type windmill of claim 1, wherein said tower is composed of several post pairs disposed annularly to form a circular loop, one post pair contains two posts, and a cross beam is transversely interposed between adjacent post pairs, the outer diameter of said windmill can be enlarged by increasing said post pairs, the size of the whole windmill can be enlarged by increasing the diameter of said looped annular track and the step of transmission means.

9. The vertical shaft type windmill of claim 1, wherein when being applied to small size generating equipment below 10 kw, the structure of said arcuate hook shaped vane blade remains unchanged, but using a smaller tower and using a hollow square rotating shaft to connect said wind vane wheel assembly in cascade on said rotary stand, the small arcuate hook shaped vane blade, small size tower and small wind vane wheel can be assembled by the non-professional user using the retail materials with the implement tools.

10. The vertical shaft type windmill of claim 1, wherein the power generated by said windmill generator can be supplied to roadway lighting of capacity below 1 kw, by keeping the structure of said arcuate hook shaped vane blade assembly unchanged, only changing the structure of said small tower into a steel pipe frame associated with a hollow rotating shaft for application to roadway lighting, the windmill for a solar energy water heater, and equipping colored LED lamps around the rim of said wind vane assembly for beautification of the night scene.

* * * * *